US005909351A

United States Patent [19]

Kane

[11] Patent Number: 5,909,351
[45] Date of Patent: Jun. 1, 1999

[54] 2-ELEMENT GAS TUBE THERMAL OVERLOAD/BACKUP GAP

[75] Inventor: Adam S. Kane, Morristown, N.J.

[73] Assignee: Lucent Techlologies, Inc., Murrat Hill, N.J.

[21] Appl. No.: 08/984,694

[22] Filed: Dec. 3, 1997

[51] Int. Cl.[6] ........ H02H 1/00

[52] U.S. Cl. ........ 361/120; 361/124; 361/103

[58] Field of Search ........ 361/120, 119, 361/124, 103, 91, 56

[56] References Cited

U.S. PATENT DOCUMENTS 5,282,109 1/1994 Smith ........ 361/119

*Primary Examiner*—Jeffrey Gaffin
*Assistant Examiner*—Stephen Jackson
*Attorney, Agent, or Firm*—Darby & Darby

[57] ABSTRACT

A backup gap type over-voltage protector and thermal protector for a two element gas discharge tube. The gas discharge tube is mounted with its electrodes between opposing fingers of a clip of electrically conductive material. One of the clip fingers contacts the tube electrode that is to be grounded and the other finger is spaced from the other tube electrode that receives the voltage by a piece of thermally meltable, electrically insulating material having at least one hole that is located under the finger. Upon failure of the gas discharge tube, an over-voltage applied to the electrode jumps the gap formed by the hole in the insulating piece back to the clip finger and is conducted to ground. Upon thermal overload of the gas discharge tube, the insulating piece melts and brings the clip finger into contact with the tube electrode receiving the voltage and connects it and the voltage line to ground.

17 Claims, 2 Drawing Sheets

2-ELEMENT GAS TUBE THERMAL OVERLOAD/BACKUP GAP

FIELD OF THE INVENTION

The invention relates to a thermal overload/backup gap arrangement for a two-element gas tube.

BACKGROUND

Gas discharge tubes (GDT) are well known for their use in providing switching to shunt an applied over-potential to a voltage reference, such as ground. The gas discharge tube operates to protect associated equipment by preventing voltage signals above a predetermined level from affecting the equipment. The tubes find use in telephone and cable television systems. In the latter, the signal voltage is carried by a coaxial cable. The gas discharge tube provides over-voltage protection and is a failsafe mechanism that provides protection against gas tube failure, such as by gas venting, and thermal overload.

Three element gas discharge tubes are in common use. These tubes have, what is commonly called, tip (or "a"), ring (or "b") and ground electrodes. When the "a" or "b" electrode of the three element tube receives a voltage equal to or greater than the tube breakdown voltage, it causes the tube gas to ionize, or break down, and the tube to conduct to provide the required short circuit to ground for voltage overload protection. Two element gas discharge tubes also are used in which one tube electrode receives the applied voltage and the other electrode is connected to ground. These operate such that the gas in the tube ionizes when the signal voltage exceeds a predetermined level as set by the tube gas and tube dimensions.

Both two element and three element gas discharge tubes are subject to possible failure, for example, breakage of the tube that permits the gas to vent. If this is unknown to the system operator, there will be no over-voltage protection. Another problem is thermal overload of the gas discharge tube, which makes it inoperative, and may cause a fire hazard.

Protection, that is, backup, against tube failure is often required. For example, in the case of tube gas venting and the consequent tube failure, there is a requirement for a backup gap device that will provide over-voltage protection in response to a certain value of applied voltage. In addition, thermal overload protection is also required to protect against repeated firing in power-cross scenarios.

SUMMARY OF THE INVENTION

The present invention provides an over-voltage breakdown backup gap and thermal overload protector for a two element gas discharge tube. In accordance with the invention, the gas discharge tube is mounted in a clip of electrically conductive material that is connected to the reference voltage source (ground). The clip has a pair of spaced fingers with one directly contacting one electrode of the tube. The other clip finger is separated from the other tube electrode by an insulator piece having a plurality of holes arranged such that at least one hole will be under the other clip finger forming an air gap between the finger and the electrode.

Upon failure of the gas discharge tube, a voltage applied to the electrode that exceeds a breakdown voltage, which is set by the thickness of the insulator piece, will jump the gap formed by the insulator piece hole and be conducted to ground by the clip. Upon thermal overload of the tube, the insulator piece melts and the clip finger makes direct contact with the tube electrode and shorts the applied voltage to ground. The protector device of the invention is simple, inexpensive, and requires no structural modification of the gas discharge tube.

OBJECTS OF THE INVENTION

It is an object of the invention to provide a backup gap over-voltage and thermal overload protector for a two-element gas discharge tube.

Another object is to provide a backup gap over-voltage protector and thermal overload protector for a two element gas discharge tube formed by a clip for holding the tube and an insulator piece between the tube electrode that receives the voltage and a finger of the clip, with the insulator piece having at least one hole under the clip finger to provide a voltage discharge gap.

A further object is to provide a backup gap over-voltage protector for a two element gas discharge tube whose electrodes are held between the fingers of an electrically conductive clip that is connected to ground.

BRIEF DESCRIPTION OF THE DRAWINGS

The foregoing and other objects and advantages of the present invention will become more apparent upon reference to the following specification and the annexed drawings in which.

DETAILED DESCRIPTION OF THE INVENTION

Figure 1:
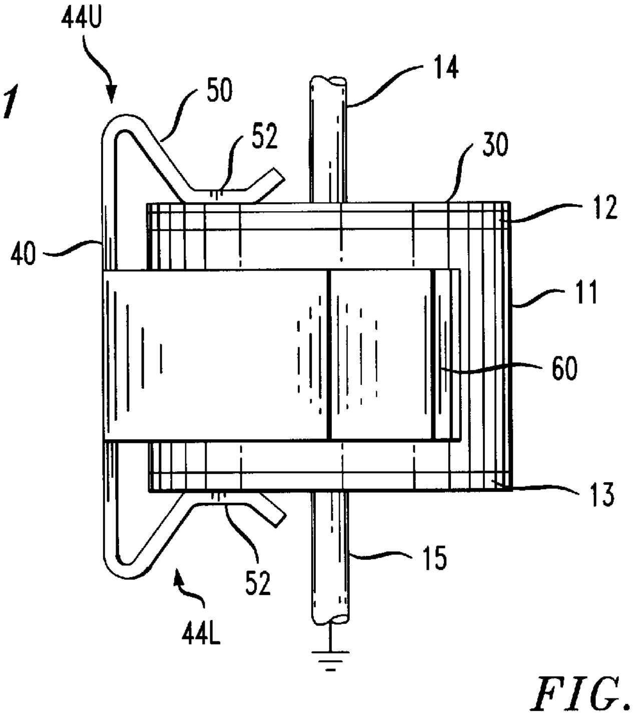
FIG. 1 is an elevational view of one embodiment of a gas discharge tube overload device according to the invention.
Figure 2A:
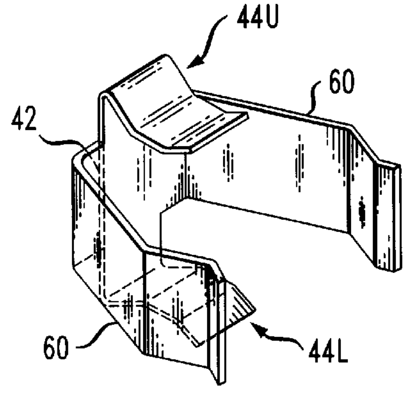
FIGS. 2A, 2B and 2C are a perspective, side elevational and top plan views of the clip of FIG. 1.
Figure 2B:
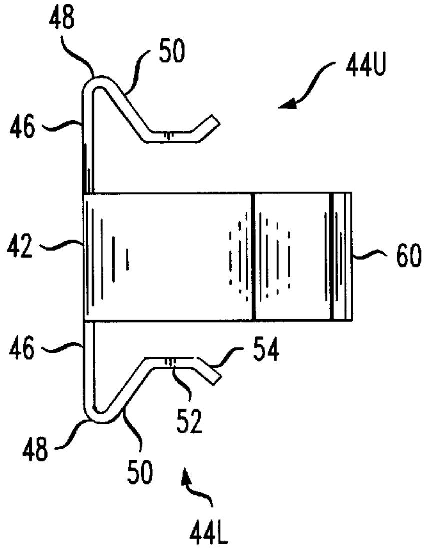
Figure 2C:
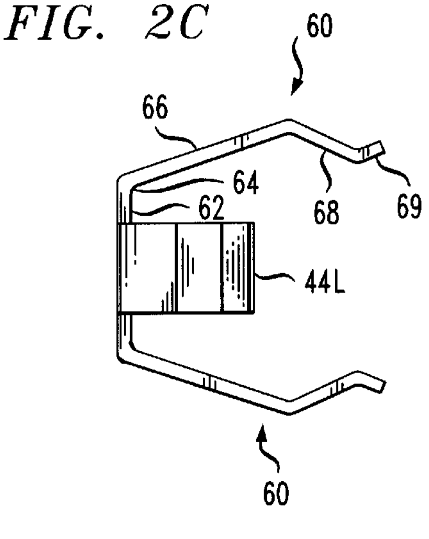
Figure 3:
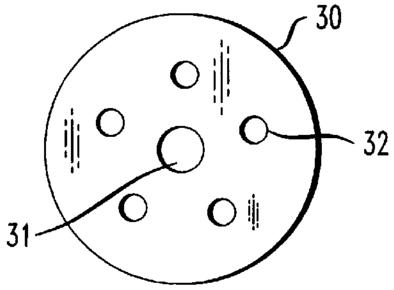
FIG. 3 is a top view of the insulator piece in the embodiment of FIG. 1.

Referring to FIGS. 1–3, there is shown a two element gas discharge tube 11 held by a clip 40 of electrically conductive material. The tube 11 can be, for example, Citel 96-230V, Siemens N81-C90X or A230X and Sankosha Y08UZ-230B type switches, and is of generally cylindrical shape. The tube 11 is sealed and contains an ionizable gas. At each end of the tube cylindrical body there is a generally cylindrical electrically conductive electrode 12 and 13, respectively. A lead wire 14, for example, the center lead of a coaxial cable, is connected to one tube electrode 12, such as by soldering. The lead 14 also can be an integral part of the tube as manufactured. Lead 14 carries the applied voltage, which can be continuous or pulsed and also can contain transients, such as from one or more crossing power lines. The other tube electrode 13 is connected to the ground voltage reference by a lead 15, which is either soldered to the tube or is integral with it.

The gas discharge tube 11 is held within spring type side fingers 60 of a clip 40. The seat portion 52 of a lower clip finger 44L contacts the tube electrode 13, while a clip finger 44U overlies an insulator piece 30, described below, lying on the electrode 12 that receives the signal voltage. When clip 40 is directly connected to ground, the lead 15 is not necessary.

FIGS. 2A–2C show the details of the clip 40 which is of electrically conductive material and can be stamped from a sheet and bent into the appropriate shape. It includes a central trunk section 42 from which extend a pair of identical upper and lower fingers 44U and 44L spaced apart by the height of the gas discharge tube 11. The terms "upper", "lower" and "side" are relative since the clip can be turned to any desired operating position. A respective vertical extension piece 46 co-planer with the trunk 42 connects each of the fingers 44 to the trunk 42. The extensions 46 set the distance between the fingers.

At the end of the vertical extension 46 of each finger 44 there is a re-entrant curve 48 that turns the finger by 90° relative to the extension 46 and provides spring resiliency for the finger. The finger 44 continues with an angled portion 50 extending from the end of the re-entrant curve 48 back toward the center of the clip, and a flat seat section 52 that is transverse to the trunk 42. The seat 52 is parallel to the tube electrode. An angled end piece 54 extends from the seat 52 away from the clip center, for example at an angle of about 30° from the seat, and provides an entry for the gas discharge tube to be inserted into the clip.

A pair of resilient side arms 60 extend from the clip trunk 42 transverse to the fingers 44 and are spaced apart by a distance somewhat less than the diameter of the gas discharge tube. Each of the arms 60 is formed by a connecting piece 62 co-planar with and extending from the trunk 42 to space the arms 60 away from the trunk. A section 66 extends from a bend 64 at the end of piece 62 which provides the spring resiliency for the arm. Thereafter, there is a piece 68 directed inwardly to the clip center and an outwardly bent end piece 69 that provides entry of the gas discharge tube into the clip arms 60.

The gas discharge tube 11 is inserted into the clip 40 between the entry end pieces 54 of the upper and lower fingers 44 and the entry end pieces 69 of the side arms 60. The flat seat 52 of the lower finger 44L provides a seat with electrical contact for the lower electrode 13 of the gas discharge tube. The flat seat section 52 of the upper finger 44U provides a seat for an insulator piece 30 between the upper arm 44U seat and the tube electrode 12. The insulator piece 30 can be loosely placed on electrode 12 or held by a small amount of adhesive.

FIG. 3 shows the details of the insulator piece 30. This can be made of MYLAR, or other similar material. MYLAR has a breakdown voltage of 4000V/mil, or approximately 1500KV/mm, thickness. It also has a melting temperature of 254 C.°.

The insulator piece 30 has a central hole 31 through which the lead wire 14 passes to the electrode 12. It also has a plurality of holes 32 arranged concentric around a center hole 31. The number of holes 32, layout pattern and diameter are selected to achieve the desired breakdown voltage. The requirement for hole spacing is that at least one hole 32 will be located under the finger seat 52. Thus, the width of the seat 52 relative to the location of the holes 32 should be such that there will always be at least one hole under the seat whatever the orientation of the tube 11 when placed in the clip. While the insulator piece 30 is shown as being circular, it can be of other shapes, such as semi-circular, square, rectangular, etc.

The thickness of the insulator piece determines the voltage that is needed to jump the gap of a hole 32. This is set to be somewhat above the level of the normal breakdown voltage of an operative tube. In an exemplary embodiment of the invention, the insulator piece 30 has the following characteristics:

| | |
|---|---|
| Material | MYLAR |
| Diameter | (.300 in) 7.6 mm |
| Thickness | (3 mils) .007 mm |
| Number of holes 32 | 6 |
| Diameter of holes 32 | (.030 in) .76 mm |
| Diameter of center hole 31 | (.080 in) 2.03 mm |
| Hole pattern | Concentric around center hole and spaced by 60° |
| Breakdown voltage | (1000 V) |
| Melting Temperature | 254 C. ° |

Figure 4A:
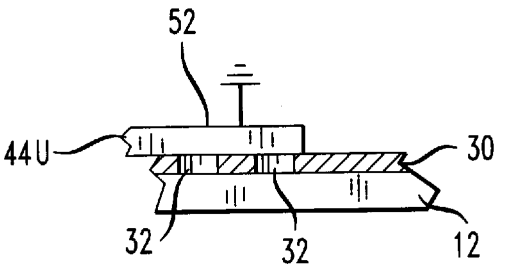
FIG. 4A is a fragmentary side elevational view of the insulator piece and clip finger with the insulator intact.

FIG. 4A shows the assembly during normal operation of the gas discharge tube. The insulator 30 spaces the seat 52 of the clip upper finger 44U from the upper electrode 12 of the gas discharge tube. If the tube is operating properly, an excess voltage on lead 14 will cause the tube gas to ionize and the voltage overload to be shunted to ground. When the gas discharge tube has become inoperative, the gas can no longer ionize and conduct the voltage to ground. With the insulator piece 30 and an inoperative tube, when the breakdown voltage of the air gap provided by the holes 32 in insulator 30 is exceeded, as determined by its thickness, the voltage applied to the tube electrode 12 passes from the electrode through the insulator piece hole 32 to the clip finger 44U and from there through the clip to the ground voltage reference. Thus, a backup gap type voltage overload protector is provided.

Figure 4B:
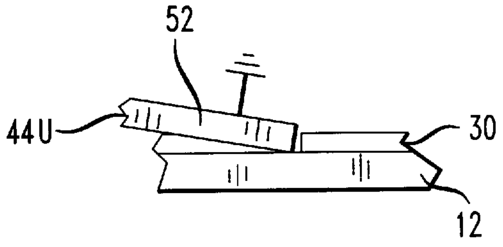
FIG. 4B is a fragmentary side elevational view of the assembly showing the insulator melted.

FIG. 4B shows the condition in which the gas discharge tube has overheated, i.e., a thermal breakdown. Here, the insulator piece 30 melts and the seat 52 of finger 44U comes into direct electrical contact with the tube electrode 12. This shorts the applied potential on lead 14 directly to ground. The presence of the holes 32 aids in the melting of the insulator piece 30 since they reduce the amount of material to be melted and also make it easier for the finger 44U to make electrical contact with the tube electrode.

Figure 5A:
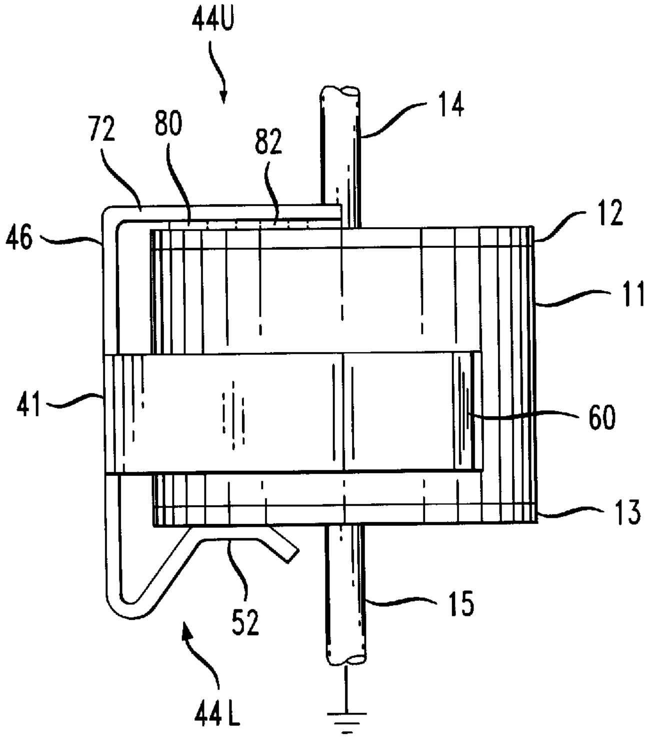
FIGS. 5A and 5B are a side elevational and a perspective views of another embodiment of the clip.
Figure 5B:
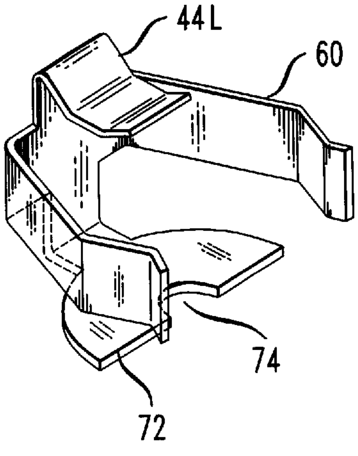
Figure 6:
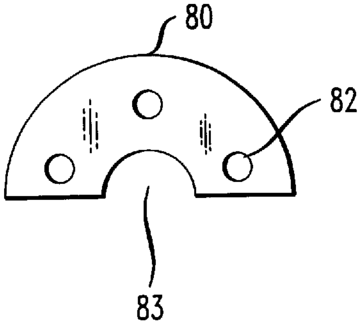
FIG. 6 is a top view of the spacer used with the clip of FIGS. 5A and 5B.

FIGS. 5A, 5B and 6 show another embodiment of the clip 40. The parts that are the same as shown in FIGS. 1 and 2A–2C have the same reference numerals. Here the difference is in the upper finger 44U (FIG. 5B shows the clip inverted from FIG. 5A) which has a plate 72 extending from and transverse to the clip extension piece 46. The plate 72 is illustratively shown as being semi-circular but it can be of another shape having an area less than that of electrode 12. The finger 44U with the plate 72 is preferably somewhat resilient, but it can be non-resilient. The lower finger 44L is also resilient so as to provide sufficient holding power for the tube between the finger 44L and the plate 72. Plate 72 has a central semi-circular cut-out 74 to provide access for lead wire 14 to the tube electrode 12.

FIG. 6 shows the insulator piece 80 for the clip 41. Piece 80 is semi-circular to correspond to the shape of the plate and is of a size to cover the plate 72. It also has a plurality of holes 82 and a semi-circular central hole 83 for access of the lead wire 14 to the electrode 12.

The operation of the assembly of FIGS. 5 and 6 to provide over-voltage and thermal protection is as previously described. While the plate 72 is shown as semi-circular, it can be of other arcuate shape, e.g. a sector of a circular shape.

As seen, the invention provides a simple but highly effective backup for both voltage overload and thermal overload when the gas discharge tube becomes inoperative. The backup requires no modification to the gas discharge tube.

I claim:

1. A backup protector for a two element gas discharge tube having a conductive electrode at each of the opposite ends of the tube, with a first electrode to receive an operating potential and a second electrode to be connected to a voltage reference, comprising:

a clip of electrically conductive material to be electrically connected to said voltage reference, said clip having spaced first and second opposing fingers between which the electrodes of the gas discharge tube are positioned, said second finger being in electrical contact with the second electrode of the tube;

an insulator of thermally meltable electrical insulating material in direct engagement between said first finger and the first gas tube electrode, the insulator having at least one hole and having a thickness set to define a breakdown voltage between the operating potential applied to the gas discharge tube first electrode and said clip first finger through said at least one hole.

2. A protector as in claim 1 wherein said at least one hole of said insulator is positioned under said first finger.

3. A protector as in claim 1 wherein said insulator is thermally meltable to provide thermal protection.

4. A protector as in claim 1 wherein said clip further comprises a pair of spaced resilient arms transverse to said first and second fingers to hold said gas tube.

5. A protector as in claim 1 wherein said insulator has a central opening to permit access of a lead wire to the gas discharge tube electrode.

6. A protector as set forth in claim 1, wherein said clip first finger is resilient so as to press against said insulator.

7. A protector as in claim 1 wherein said clip first and second fingers extend from a common trunk piece and each finger has a seat portion which is parallel to the respective gas discharge tube electrode.

8. A protector as in claim 7 wherein at least said second finger is resilient.

9. A protector as in claim 7 wherein each of said first and second fingers is resilient.

10. A protector as in claim 1 wherein said gas discharge tube one electrode is generally circular and said clip first finger has a seat of lesser area than said one electrode.

11. A protector as in claim 10 wherein said clip first finger is substantially non-resilient.

12. A protector as in claim 10 wherein said semi-circular insulator has a central opening to permit access of a lead wire to the gas tube one electrode.

13. A protector as in claim 10 wherein said seat is of generally semi-circular shape.

14. A protector as in claim 13 wherein said insulator is of semi-circular shape conforming to that of said semi-circular seat.

15. A protector as in claim 10, wherein said clip second finger is resilient.

16. A protector as set forth in claim 15 wherein said clip first finger is resilient.

17. A protector as in claim 16 wherein said clip further comprises a pair of spaced resilient arms transverse to said first and second fingers to hold said gas tube.

* * * * *

UNITED STATES PATENT AND TRADEMARK OFFICE

CERTIFICATE OF CORRECTION

PATENT NO. : 5,909,351
DATED : June 1, 1999
INVENTOR(S) : Adam S. KANE

It is certified that error appears in the above-identified patent and that said Letters Patent is hereby corrected as shown below:

On the title page item [73] Assignee, change "MURRAT" to --MURRAY--.

Signed and Sealed this

Twenty-first Day of December, 1999

Attest:

Q. TODD DICKINSON

*Attesting Officer* — *Acting Commissioner of Patents and Trademarks*